Figure 1:
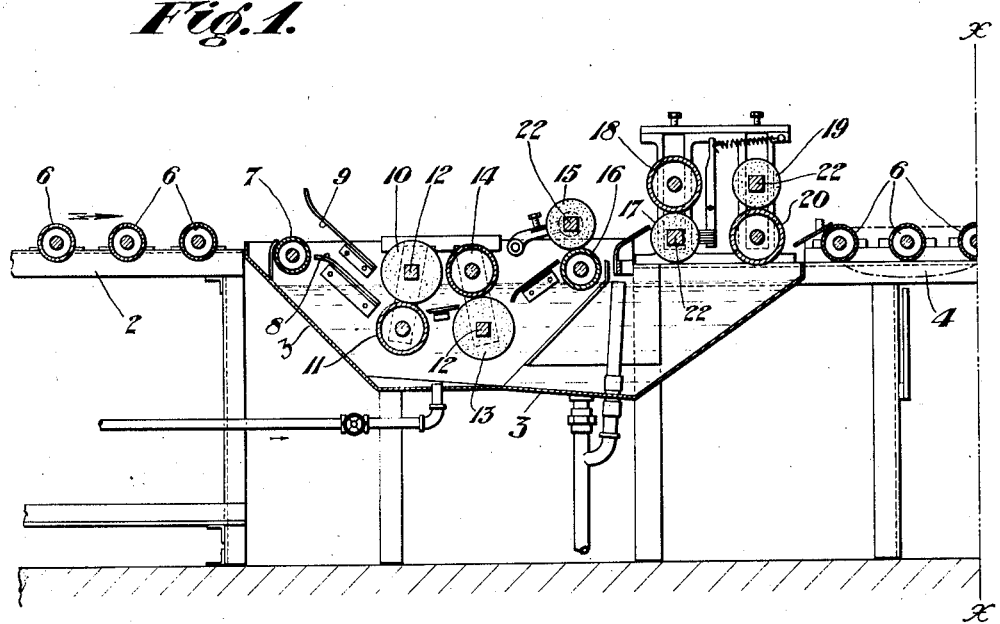
Figure 1:
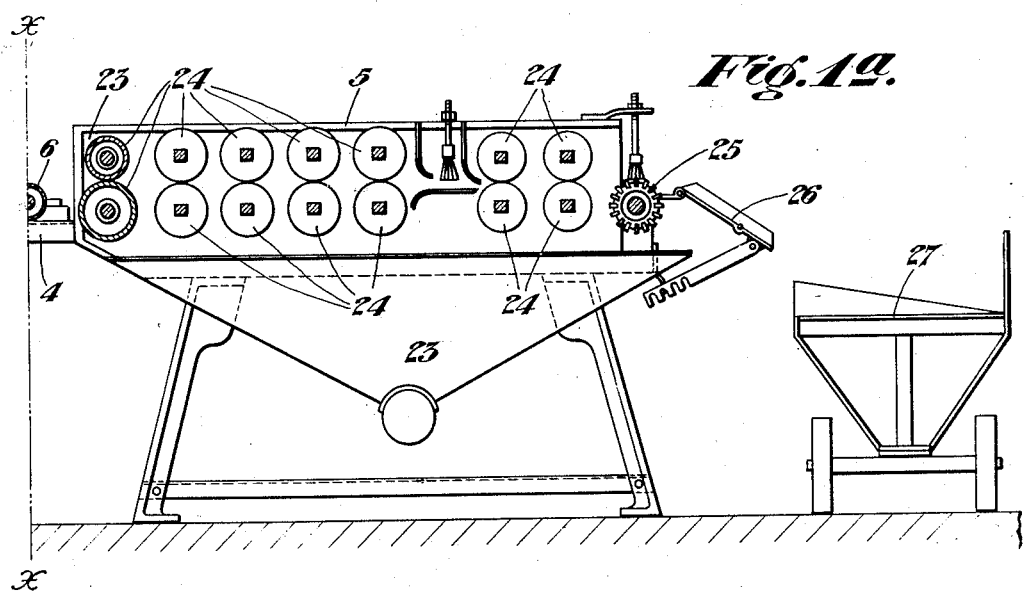

July 24, 1928.

T. O'BRIEN ET AL

METHOD OF CLEANING TIN PLATE

Filed Feb. 10, 1926

1,678,297

Fig. 1ª.

Witnesses:
Edwin Trueb

Inventor:
THOMAS O'BRIEN
RUFUS E. ZIMMERMAN
by their Attorney.

Patented July 24, 1928.

1,678,297

UNITED STATES PATENT OFFICE.

THOMAS O'BRIEN, OF SHARON, AND RUFUS E. ZIMMERMAN, OF PITTSBURGH, PENNSYLVANIA, ASSIGNORS TO AMERICAN SHEET AND TIN PLATE COMPANY, OF PITTSBURGH, PENNSYLVANIA, A CORPORATION OF NEW JERSEY.

METHOD OF CLEANING TIN PLATE.

Application filed February 10, 1926. Serial No. 87,325.

This invention relates to the manufacture of tin plate and more particularly to a method and apparatus for cleaning tin plate after the tinning or coating operation has been completed in order to remove the excess oil and other foreign matter carried on the surfaces of the plates.

One object of the present invention is to provide a method and apparatus that will produce cleaner plates than is possible to produce by the methods and apparatus heretofore used.

Another object is to provide a method and apparatus which will remove the oil in the form of an emulsion which may be treated to recover the oil so that such oil may be used over and over in the tinning operation.

Another object is to provide a method and apparatus capable of cleaning and polishing the plates with a very small amount of bran or middlings.

A further object is to provide a method and apparatus which will operate efficiently and effectively regardless of the temperature of the plates, thus eliminating the delays heretofore encountered due to hot plates.

A still further object is to provide the novel method and apparatus described in detail in the following specification and illustrated in the accompanying drawings.

In the drawings:

Figure 1 is a side elevation showing part of the plate cleaning apparatus for carrying out our improved method.

Figure 1ª is a side elevation of the remainder of the cleaning apparatus, the apparatus of Figures 1 and 1ª being divided on the line X—X.

In its simplest form, the method of this invention consists in passing the plates to be cleaned from the tinning pot, at which time they carry more or less oil on their surfaces, into and through a body of non-inflammable liquid. The oil and other foreign matter is removed from plates by a combination of the action of the liquid medium and a mechanical scrubbing operation which may be effected while the plates are passing through the liquid or a part of the oil may be removed in the liquid and the remainder squeezed and wiped off in subsequent continuous steps.

Ordinary tap water is the basis of the liquid medium employed to remove the oil and other foreign matter from the plates and may be used plain, or as follows:—mixture of water with soap, aqueous solution or suspension of borax, sodium phosphate, soda ash, sodium silicate, and various other substances which have detergent value. It will also be understood that any combination or combinations of the above ingredients may be used.

This novel method may be carried out by means of the apparatus of the drawings which comprise a conveyer 2 for carrying the plates from the tinning pot to a washing tank 3. A second conveyer 4 extends from the tank 3 to a dry-cleaning machine 5 known in the art as a branner.

The conveyers 2 and 4 are of the roller-type having feed rollers 6 journaled thereon.

The tank 3 is preferably provided at its entrance end with a magnetic roller 7 adapted to receive the plates from the conveyer 2 and to feed them through a pair of guides 8 and 9 into the bite of a pair of scrubbing rolls 10 and 11. The upper roll 10 is preferably composed of a series of flannel or other fabric discs assembled on a central square shaft 12 and forced tightly together so as to form a continuous relatively rigid and absorbing roll. The roll 11 is a polished steel roll and rotates at a relatively slower speed than the roll 10. A second pair of rolls 13 and 14 are journaled in advance of the rolls 10 and 11. The lower roll 13 is of the same construction as roll 10 of the first mentioned pair of rolls, and the roll 14 is of polished steel the same as roll 11, and is also rotated at a relatively slower speed than the roll 13.

The rolls 10, 11 and 13, 14 are journaled so that their bite will be below the level of the washing liquid in the tank so as to maintain the plates immersed during their passage through the rolls.

Three pairs of squeezing and rubbing rolls 15, 16; 17, 18; and 19, 20 are journaled one in advance of the other forward of the rolls 13, 14, and are arranged so that their bite is above the level of the washing liquid. The upper roll 15 of the first pair of rolls, the lower roll 17 of the second pair of rolls, and the upper roll 19 of the third pair of rolls are each composed of a series of canvas or other similar fabric discs, assembled on a square shaft 22 and forced tightly together so as to form a continuous-relatively rigid roll. The other rolls 16, 18 and 20 of the pairs of rolls are of polished steel and are rotated at a relatively slow surface speed to the rolls 15, 17 and 19.

All of the rolls 10, 11; 13, 14; 15, 16; 17, 18; and 19, 20 are independently driven, and the differential speed between the rolls of each pair is such that the fabric roll of each pair will rotate relative to the plates, thus rubbing or scouring the surfaces of the plates and, since the fabric rolls are arranged alternately as the top and bottom rolls of the successive pairs of rolls, both the top and bottom surfaces of the plates will be rubbed or scoured.

The rolls 10, 11 and 13, 14 having their bites below the level of the liquid in the tank 3, will cause a scrubbing action and aid in the emulsification of the oil, while the rolls 15, 16; 17, 18; and 19, 20 will squeeze off the major portion of liquid, either cleaning liquid or oil, remaining on the plates, and the rubbing action of the fabric disc rolls will polish the plates.

In some instances the plates may be delivered directly from the rolls 19, 20 in finished form. However, the operation may be continued by passing the plates from the tank 3 over the conveyer 4 to the "branner" or dry cleaning apparatus 5.

The apparatus 5 is of well-known construction and comprises a hollow body or receptable portion 23 adapted to contain a body or quantity of an absorbing and scouring material such a bran or middlings. A plurality of pairs of rollers 24 are journaled in the receptacle 23 and serve to convey the plates through the absorbing and scouring medium. By the defferential speed of these rolls a wiping and cleaning action on the plates is obtained.

A feed-out roll 25 is journaled at the outlet end of the receptable 23 and is preferably of the magnetic type so as to engage and feed the plates from the apparatus onto the inclined chute 26 from which they pass by gravity onto a car 27 or other receiver.

In carrying out the method of this application the tank 3 is first filled to the proper level with a non-inflammable liquid or liquid compound such as described in the forepart of this specification. The liquid most generally used so far in commercial practice is approximately 0.2 per cent solution of soda ash (sodium carbonate) in water. The solution preferably will be maintained at a temperature of from 140 to 190 degrees F.

The plates pass along the conveyer 2 from the tin pot and are seized by the magnetized roller 7 and fed down through the guides 8 and 9 into the washing liquid and into the bite of the scrubbing rolls 10 and 11. The roll 10, due to its having a higher speed than the roll 11, will have a rubbing or scrubbing action on the top of the plates, while at the same time cooperating with the roll 11 to feed the plates forward into the bite of the rolls 13, 14. The roll 13, like the roll 10, will have a rubbing or scrubbing action on the lower or bottom face of the plates, due to its having a higher speed than the roll 14, while at the same time cooperating with the roll 14 to feed the plates into the bite of the rolls 15, 16.

The rubbing or scrubbing action of the rolls 10 and 13, together with the detergent and emulsifying action of the washing liquid, removes the major portion of the oil and other foreign matter from the plates.

The rolls 15, 16; 17, 18; and 19, 20 are the squeezing and rubbing rolls, and the rolls 15, 17 and 19 wipe the plates, due to their higher speed, so as to remove the major portion of the washing liquid and oil remaining on the plates.

As stated above in many instances the process may be stopped at this point, since the plates will be sufficiently clean to make a commercial product. However, in some instances it is desirable to dry-clean the plates by permitting them to pass over the conveyer 4 into the branner 5, where they are gripped between the rollers 24 and fed through the apparatus. The branner is filled with a quantity of bran, middlings or other suitable absorbing and scouring material, and as the plates pass therethrough they are finally cleaned and polished.

Experience has shown that as much as 90 per cent of the oil and foreign matter is removed from the plates by the washing or scrubbing operation in the washing apparatus illustrated. It has also been shown by experience that when found desirable the method may be practiced in such a manner as to remove all of the oil and foreign substances by the scrubbing steps without the use of a branner.

It will be understood that we do not wish to be limited to the exact form of apparatus or specific steps of the method set forth above since they may be varied to suit various operating conditions, for instance, if desired, a greater number of scrubbing rolls may be used, or the squeezing and rubbing rolls may be multiplied, the construction of the scrubbing rolls may be changed, or a rinsing step may be combined with the rubbing and squeezing step when desired without departing from the scope of our invention as defined in the appended claims.

We claim—

1. The method of cleaning oil having a recoverable value from tin plates after tinning, which consists in scrubbing said plates in a non-inflammable liquid from which the oil may be readily recovered to remove said oil and other matter therefrom, then removing the liquid with said oil from said plates, and then passing said plates through a body of absorbent material to finally remove any remaining oil and any remaining moisture from said plates.

2. The method of cleaning oil having a recoverable value from tin plates after tinning, which consists in scrubbing both sides of said plates in a non-inflammable liquid from which the oil may be readily recovered to remove said oil and other matter therefrom, then removing the liquid with said oil from said plates, and then passing said plates through a body of absorbent material to finally remove any remaining oil and any remaining moisture from said plates.

3. The method of cleaning oil having a recoverable value from tin plates after tinning, which consists in scrubbing both sides of said plates in a non-inflammable liquid from which the oil may be readily recovered to remove said oil and other matter therefrom, then subjecting both sides of said plates to a combined squeezing and rubbing action to remove the liquid with said oil from said plates, and then passing said plates through a body of absorbent material to finally remove any remaining oil and any remaining moisture from said plates.

4. The method of cleaning oil having a recoverable value from tin plates after tinning, which consists in scrubbing both sides of said plates in a non-inflammable liquid from which the oil may be readily recovered to remove said oil and other matter therefrom, then subjecting both sides of said plates to a combined squeezing and rubbing action to remove the liquid with said oil from said plates, and then passing said plates through a body of cereal product to finally remove any remaining oil and any remaining moisture from said plates.

5. The method of cleaning oil having a recoverable value from tin plates after tinning, which consists in scrubbing both sides of said plates in a non-inflammable liquid from which the oil may be readily recovered to remove said oil and other matter therefrom, then subjecting both sides of said plates to a combined squeezing and rubbing action to remove the liquid with said oil from said plates, and then passing said plates through a body of finely divided absorbent material to finally remove any remaining oil and any remaining moisture from said plates.

6. The method of more perfectly cleaning oil having a recoverable value from tin plates after tinning than is possible with the ordinary branner, which consists in scrubbing both sides of said plates in a non-inflammable liquid from which the oil may be readily recovered to remove said oil and other matter therefrom, then subjecting both sides of said plates to a combined squeezing and rubbing action to remove the liquid with said oil from said plates, and then finally drying and polishing said plates.

In testimony whereof I have hereunto signed my name.

THOMAS O'BRIEN.

In testimony whereof I have hereunto signed my name.

RUFUS E. ZIMMERMAN.